(12) United States Patent
Yamamoto

(10) Patent No.: US 9,362,048 B2
(45) Date of Patent: Jun. 7, 2016

(54) CONTACTLESS POWER FEED EQUIPMENT

(75) Inventor: Masaaki Yamamoto, Osaka (JP)

(73) Assignee: Daifuku Co., Ltd., Osaka (JP)

( * ) Notice: Subject to any disclaimer, the term of this patent is extended or adjusted under 35 U.S.C. 154(b) by 521 days.

(21) Appl. No.: 14/002,759

(22) PCT Filed: Mar. 8, 2012

(86) PCT No.: PCT/JP2012/055898
§ 371 (c)(1),
(2), (4) Date: Sep. 3, 2013

(87) PCT Pub. No.: WO2012/124580
PCT Pub. Date: Sep. 20, 2012

(65) Prior Publication Data
US 2013/0334896 A1 Dec. 19, 2013

(30) Foreign Application Priority Data

Mar. 16, 2011 (JP) .................... 2011-057324

(51) Int. Cl.
*H02J 50/00* (2016.01)
*H02J 50/10* (2016.01)
*H02J 50/12* (2016.01)
*H02J 50/80* (2016.01)
*H01F 38/14* (2006.01)
(Continued)

(52) U.S. Cl.
CPC ............. *H01F 38/14* (2013.01); *B60L 3/003* (2013.01); *B60L 3/04* (2013.01); *B60L 11/182* (2013.01); *B60L 11/1833* (2013.01); *B60L 2200/18* (2013.01); *B60L 2210/10* (2013.01); *B60L 2210/30* (2013.01); *B60L 2210/40* (2013.01); *B60L 2240/527* (2013.01); *B60L 2240/529* (2013.01); *Y02T 10/7005* (2013.01);
(Continued)

(58) Field of Classification Search
CPC ............................. H01F 38/14; B60L 11/182
USPC .......................................................... 307/104
See application file for complete search history.

(56) References Cited

U.S. PATENT DOCUMENTS 6,924,618 B2    8/2005  Matsushiro et al. .......... 318/811
7,733,676 B2    6/2010  Nunoya et al. ................. 363/72
(Continued)

FOREIGN PATENT DOCUMENTS

CN    1531189 A    9/2004   ............... H02P 9/10
CN    1543047 A   11/2004   ............... H02M 7/48
(Continued)

OTHER PUBLICATIONS

Office Action (dated Apr. 3, 2015) issued in connection with Chinese Patent Application No. 201280004565.6.
(Continued)

*Primary Examiner* — Rexford Barnie
*Assistant Examiner* — Thai Tran
(74) *Attorney, Agent, or Firm* — Kusner & Jaffe

(57) ABSTRACT

At the start of power supply from a power supply device to an induction line, the oscillation frequency of an inverter of the power supply device is set at a predetermined frequency shifted from the resonance frequency of a resonant circuit. After a predetermined time, the frequency is changed from the predetermined frequency to the resonance frequency. Thus, at the start of power supply, only small power is obtained by the resonant circuits in all transport carriages from the induction line in a full-load condition. Thus, total power is suppressed within power that can be supplied by the power supply device, avoiding an overloaded condition of the power supply device.

4 Claims, 7 Drawing Sheets

(51) Int. Cl.
  *B60L 11/18* (2006.01)
  *B60L 3/00* (2006.01)
  *B60L 3/04* (2006.01)

(52) U.S. Cl.
  CPC .......... *Y02T10/7072* (2013.01); *Y02T 10/7216* (2013.01); *Y02T 10/7241* (2013.01); *Y02T 90/12* (2013.01); *Y02T 90/121* (2013.01); *Y02T 90/122* (2013.01); *Y02T 90/125* (2013.01); *Y02T 90/127* (2013.01); *Y02T 90/14* (2013.01)

(56) References Cited

U.S. PATENT DOCUMENTS

| | | | | |
|---|---|---|---|---|
| 8,446,046 | B2 | 5/2013 | Fells et al. | 307/104 |
| 2004/0178773 | A1 | 9/2004 | Eguchi et al. | 320/140 |
| 2011/0025132 | A1 | 2/2011 | Sato | 307/104 |

FOREIGN PATENT DOCUMENTS

| | | | | |
|---|---|---|---|---|
| JP | 11-341713 | 12/1999 | | H02J 17/00 |
| JP | 2000-125487 | 4/2000 | | H02J 17/00 |
| JP | 2005-313884 | 11/2005 | | B60M 7/00 |
| JP | 2006-050852 | 2/2006 | | B60L 5/00 |
| JP | 2008-206327 | 9/2008 | | H02J 17/00 |
| JP | 2009-101884 | 5/2009 | | B60M 7/00 |
| JP | 2009-268181 | 11/2009 | | H01J 17/00 |
| TW | 201034334 | 9/2010 | | H02J 17/00 |
| WO | WO 2009/116025 | 9/2009 | | H02M 7/12 |

OTHER PUBLICATIONS

Office Action (dated Jun. 3, 2015) issued in connection with Taiwan Patent Application No. 101108216.
International Search Report for International Application No. PCT/JP2012/055898, Jun. 12, 2012.

CONTACTLESS POWER FEED EQUIPMENT

FIELD OF INVENTION

The present invention relates to contactless power feed equipment that feeds power in a contactless manner to a plurality of apparatuses or devices from an induction line fed with a high-frequency current.

BACKGROUND OF THE INVENTION

Known contactless power feed equipment is disclosed in Japanese Patent Laid-Open No. 2009-101884.

The contactless power feed equipment includes a continuous induction line provided along the travel path of a mobile unit and a power supply device that supplies a high-frequency current at a predetermined frequency to the induction line.

The power supply device includes: a rectifier that converts the alternating current of an alternating-current power supply (commercial power supply) to a direct current, the alternating-current power supply having a varying alternating voltage; a step-up/down circuit that raises and lowers the output voltage (direct voltage) of the rectifier according to the load of the induction line; and an inverter.

In the inverter, a direct current raised or lowered by the step-up/down circuit is converted into a constant alternating current at the predetermined frequency by a plurality of switching elements driven to keep a constant current flowing to the induction line under PWM control, and then the alternating current is supplied as an output current to the induction line.

The mobile unit includes a power receiving coil opposed to the induction line, the power receiving coil receiving an electromotive force induced from the induction line. The power receiving coil is connected to a power receiving unit that controls an output voltage to a constant voltage and supplies the voltage to a load having varying power consumption.

With this configuration, the constant alternating current at the predetermined frequency is supplied from the power supply device to the induction line, and the mobile unit receives power for the load by an electromotive force induced from the induction line to the power receiving coil. Also in the case where the alternating-current power supply varies in alternating voltage, the step-up/down circuit raises or lowers a direct voltage applied to the inverter, depending on the state of the load of the induction line. Thus, the alternating current passing through the induction line is stably controlled to a constant current.

Japanese Patent Laid-Open No. 11-341713 discloses an example of a secondary-side power receiving circuit having the functions of the power receiving coil and the power receiving unit.

In the secondary-side power receiving circuit, a resonant capacitor is connected to the power receiving coil, the resonant capacitor forming a resonant circuit that resonates at the frequency of an induction line with the power receiving coil. A rectifying circuit is connected to the resonant capacitor and a constant voltage control circuit that controls an output voltage to a reference voltage. A load is connected to the constant voltage control circuit to receive power from the constant voltage control circuit in a resonant condition.

The constant voltage control circuit includes a choke coil, a diode, an output capacitor (voltage capacitor), a switching device (e.g., a transistor for power adjustment) that switches between a connected condition (the switching device is turned on) and an opened condition (the switching device is turned off) across the output ends of the rectifying circuit, and a control circuit.

The control circuit controls the switching device so as to control an output voltage (the voltage of the load, that is, the voltage of the output capacitor) to a reference voltage. In other words, the output voltage is measured, the load decreases while the output voltage (a voltage across the output capacitor) increases, and then the output voltage exceeds a preset reference voltage. At this point, the switching device is placed in the connected condition to reduce the output voltage. When the output voltage returns to the reference voltage, the switching device is placed in the opened condition to keep the output voltage to the reference voltage.

Unfortunately, the known contactless power feed equipment causes the following problems: in an initial condition before the induction line receives a high-frequency current, the constant voltage control circuit of each mobile unit has an output voltage (the voltage of the output capacitor) of 0 V. When the supply of a high-frequency current to the induction line is started, the constant voltage control circuit of each mobile unit brings the switching device into a full-load condition, which is a continuous opened condition, to charge the output capacitor. This starts control for increasing the output voltage to the reference voltage. In this way, when the supply of a high-frequency current to the induction line is started from the initial condition, all the mobile units receive power in the full-load condition. Thus, the power supply device becomes overloaded and the protective function of the power supply device is activated so as to interrupt power supply to the induction line, thereby stopping all the mobile units. This is because the capacity of power that can be supplied from the power supply device to the induction line is set so as to supply power (power in a normal load condition) consumed by the loads of the mobile units while the output capacitors of all the mobile units are charged (at a constant voltage). If a power capacity exceeding the power of the normal load condition is requested to the power supply device, the power supply device can supply excessive power in a normal condition, increasing the cost of the power supply device.

The same problem occurs also in a momentary power failure of a commercial power supply that supplies power to the power supply device. Specifically, a momentary power failure interrupts power supply from the power supply device to the induction line. Thus, power charged to the output capacitor is supplied to the load in each mobile unit, leading to a rapid decrease in output voltage. When power supply to the induction line is restarted, the constant voltage control circuit of each mobile unit starts control for increasing the output voltage of the full-load condition to the reference voltage. Hence, all the mobile units are placed in the full-load condition and thus the power supply device becomes overloaded, interrupting power supply from the power supply device to the induction line.

Furthermore, the same problem occurs when the power supply to the induction line is temporarily interrupted and then is restarted in an energy-saving operation or at the restart of power supply to the induction line when power supply is repeatedly interrupted and restarted in an intermittent operation.

SUMMARY OF INVENTION

Technical Problem

The present invention is devised to solve these problems. An object of the present invention is to provide contactless power feed equipment that can stably feed power in a continuous manner at the start of power supply from the power supply device to the induction line.

Solution to Problem

In order to attain the object, contactless power feed equipment according to the present invention is contactless power feed equipment that feeds a high-frequency current from a power supply device to an induction line, and then feeds power to a plurality of devices or apparatuses in a contactless manner from the induction line having received the high-frequency current, the device or apparatus including: a pickup coil opposed to the induction line, the pickup coil receiving an induced electromotive force from the induction line; a resonant capacitor connected in parallel to the pickup coil, the resonant capacitor forming a resonant circuit that resonates at the frequency of the high-frequency current with the pickup coil; a full-wave rectifying circuit connected in parallel with the resonant capacitor of the resonant circuit; a switch and an output capacitor connected in parallel between the output terminals of the full-wave rectifying circuit, the output capacitor feeding power to a load with varying power consumption; and a controller that controls the voltage of the output capacitor to a constant reference voltage by switching a connected condition and an opened condition of the switch, the power supply device including: a rectifying circuit that converts an alternating current from a commercial power supply to a direct current; an inverter that converts the direct current to a high-frequency current having any oscillation frequency and then supplies the current to the induction line; and a controller that controls the oscillation frequency of the inverter of the power supply device to a predetermined frequency shifted from the resonance frequency of the resonant circuit at the start of power supply from the power supply device to the induction line such that the resonant circuit suppresses total power obtainable by all the devices or apparatuses within power that can be supplied by the power supply device, the controller changing the predetermined frequency to the resonance frequency after a predetermined time during which the power supply to the induction line is capable of increasing the output voltage of the output capacitor of the device or apparatus to a reference voltage.

The resonance frequency of the resonant circuit provided in the device or apparatus is equal to the frequency of an alternating current (high-frequency current) supplied from the power supply device to the induction line. At this point, a maximum current (resonance current) can be obtained from the resonant circuit. When the resonance frequency of the resonant circuit is not equal to an alternating current supplied to the induction line, a current obtainable from the resonant circuit decreases as the frequency of the alternating current is deviated from the resonance frequency, leading to a reduction in obtainable (receivable) power. This reduces total power supplied to all the devices or apparatuses when viewed from the power supply device.

According to the configuration of the present invention, the contactless power feed equipment of the present invention has useful technical operation and effect as follows:

When the power supply device starts supplying power to the induction line, the oscillation frequency of the inverter of the power supply device is a predetermined frequency shifted from the resonance frequency of the resonant circuit. Even if all the devices or apparatuses obtain power from the induction line in a full-load condition, power obtainable (receivable) by the resonant circuit of the device or the apparatus decreases, suppressing total power within power that can be supplied by the power supply device. This can prevent the power supply device from becoming overloaded. After a predetermined time during which the output voltage of the output capacitor can increase to the reference voltage, the oscillation frequency of the inverter of the power supply device is changed from the predetermined frequency to the resonance frequency, increasing power obtainable by the device or the apparatus from the induction line. At this point, the normal device or apparatus obtains only power equivalent to power consumed by the load of the device or apparatus. Thus, all the devices or apparatuses do not simultaneously obtain power in the full-load condition. An increase to the reference voltage is delayed in some of the devices or apparatuses, and thus only some of the devices or apparatuses obtain power in the full-load condition. This can prevent the power supply device from becoming overloaded, stably starting power supply from the power supply device to the induction line.

DETAILED DESCRIPTION OF THE INVENTION

An embodiment of the present invention will be described below with reference to the accompanying drawings.

Figure 1:
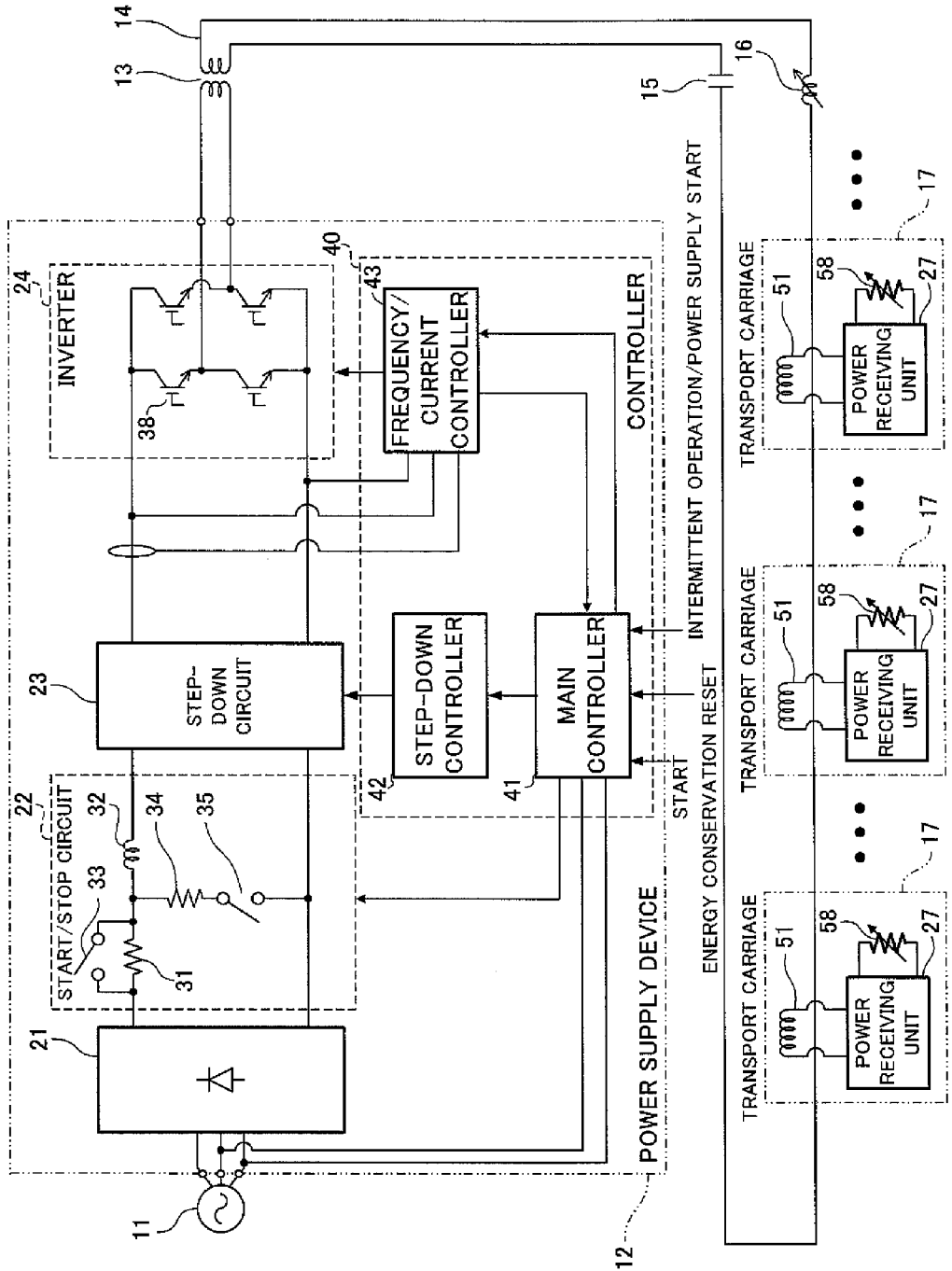
FIG. 1 is a circuit diagram showing contactless power feed equipment according to an embodiment of the present invention.

FIG. 1 is a circuit diagram showing contactless power feed equipment according to the embodiment of the present invention. In the contactless power feed equipment, a high-frequency current is supplied from a power supply device 12 to an induction line 14, and then power is supplied in a contactless manner to a plurality of transport carriages (an example of an apparatus or a device) 17 from the induction line 14 having received the high-frequency current. The induction line 14 is continuously provided (placed) along the traveling rail (an example of a travel path, not shown) of the transport carriages 17. A capacitor 15 is connected in series with the induction line 14. Furthermore, a variable inductor 16 for adjusting the inductance value of the overall induction line 14 is connected in series with the induction line 14. The variable inductor 16 is connected if the induction line 14 does not have a predetermined line length, that is, if the induction line 14 does not have a predetermined inductance value. A high-frequency transformer 13 is disposed between the induction line 14 and the power supply device 12. The high-frequency transformer 13 can amplify an output voltage when the induction line 14 has a long distance (length). For example, the high-frequency transformer 13 is installed to double the output voltage.

Figure 4:
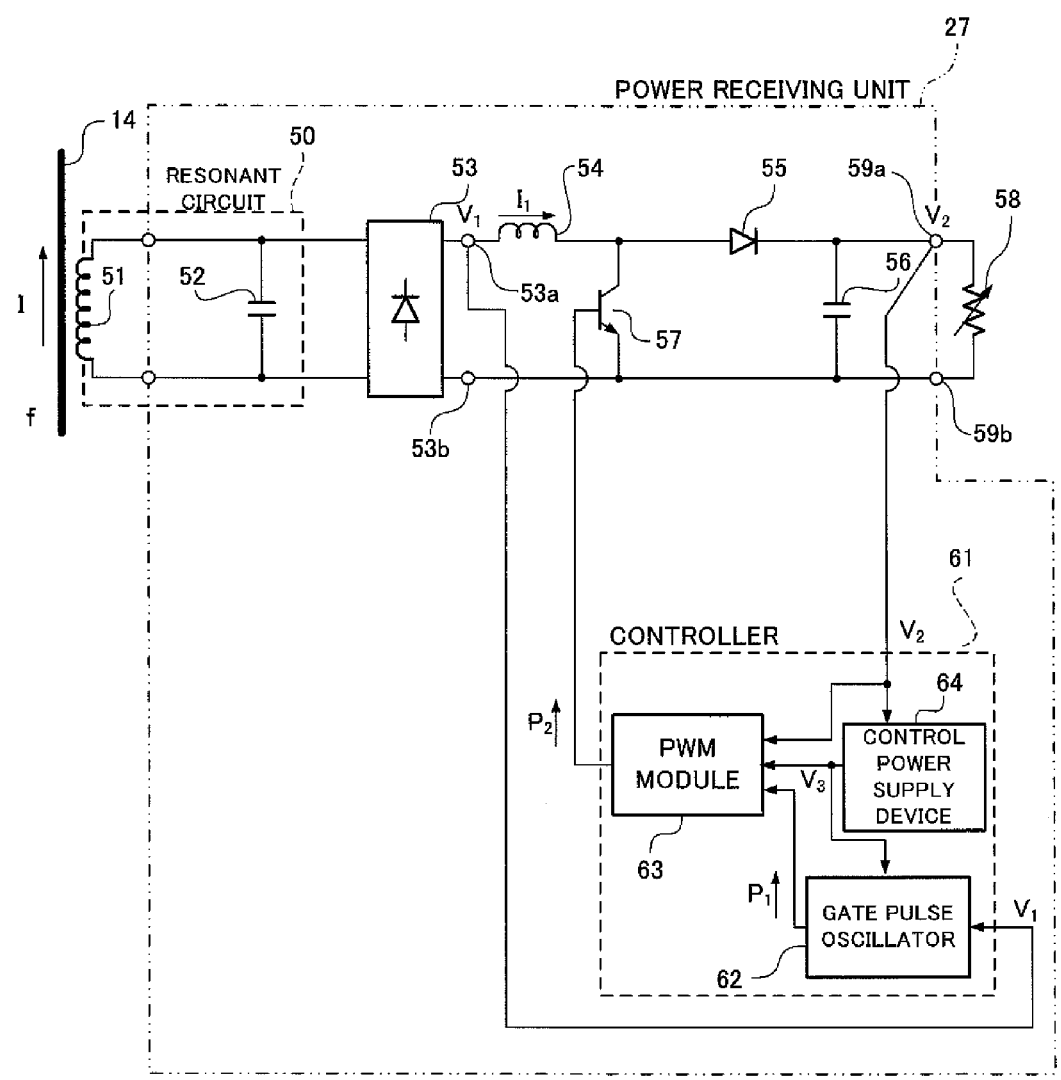
FIG. 4 is a circuit diagram showing a secondary-side power receiving circuit in the contactless power feed equipment.

The transport carriage 17 includes a pickup coil 51 opposed to the induction line 14 so as to receive an electromotive force induced from the induction line 14. The pickup coil 51 is connected to a power receiving unit 27. As shown in FIG. 4, the power receiving unit 27 is connected to a load (e.g., an inverter for controlling the traveling motor of the transport carriage 17) 58 with varying power consumption.

As will be specifically described later, the power receiving unit 27 has the function of constant voltage control for controlling an output voltage to the load 58 to a constant voltage. Thus, as shown in FIG. 4, the terminal end of the power receiving unit 27 includes an output capacitor (voltage capacitor) 56. The voltage of the output capacitor 56 is fed back to control an output voltage to the load 58 at a constant voltage. The pickup coil 51 is connected in parallel with a resonant capacitor 52 that forms a resonant circuit 50 with the pickup coil 51, the resonant circuit 50 resonating at the frequency of the high-frequency current passing through the induction line 14. The resonance frequency of the resonant circuit 50 is set at 9.74 kHz.

<Power Supply Device>

The power supply device 12 is connected to a commercial power supply 11. The power supply device 12 includes a rectifying circuit 21 that converts an alternating current from the commercial power supply 11 into a direct current, a start/stop circuit 22, a step-down circuit 23, an inverter 24, and a controller 40.

The controller 40 includes a main controller 41, a step-down controller 42, and a frequency/current controller 43, each including a CPU (specifically described later). The power supply device 12 further includes a protective device (not shown) that detects whether a current passing through the induction line 14 is an overcurrent (overload) or not. When the protective device detects an overload, the main controller 41 interrupts a current supplied to the induction line 14 (described later).

"Start/Stop Circuit 22"

The start/stop circuit 22 includes an inrush resistor 31 and a coil (reactor) 32 that are connected in series between the rectifying circuit 21 and the step-down circuit 23, a starting conductor 33 that short-circuits the inrush resistor 31, and a discharging resistor 34 and a stopping conductor 35 that are connected in series between the node of the inrush resistor 31 and the coil 32 and the rectifying circuit 21.

The starting conductor 33 and the stopping conductor 35 are controlled to a connected condition/opened condition by the main controller 41, which will be described later. Specifically, when the power supply device 12 is started, the starting conductor 33 is opened to cause the inrush resistor 31 to suppress an inrush current. After a predetermined time from the start of the power supply device 12, the starting conductor 33 is connected to short-circuit the inrush resistor 31. The stopping conductor 35 is opened during an operation, and the stopping conductor 35 is connected at shutdown. The discharging resistor 34 consumes charge accumulated in the power supply device 12.

"Step-Down Circuit 23"

The step-down circuit 23 is a step-down device that lowers a direct voltage to be supplied to the inverter 24 according to the load of the induction line 14. The step-down circuit 23 lowers a direct voltage inputted from the rectifying circuit 21 through the start/stop circuit 22. Moreover, the step-down circuit 23 is driven and controlled by the step-down controller 42. The step-down controller 42 receives a first voltage mode command and a second voltage mode command from the main controller 41, which will be described later, and then drives the step-down circuit 23 in response to the inputted mode command.

The first voltage mode command is a mode command for outputting a direct voltage inputted from the rectifying circuit 21 without lowering the direct voltage. The second voltage mode command is a mode command for saving energy by lowering the direct voltage to a predetermined voltage, allowing the supply of preset power typically consumed by the induction line 14.

In the first voltage mode command, a direct voltage inputted from the rectifying circuit 21 is directly supplied from the step-down circuit 23 to the inverter 24, whereas in the second voltage mode command, the lowered predetermined voltage is supplied from the step-down circuit 23 to the inverter 24.

"Inverter 24"

The inverter 24 converts the direct current outputted from the step-down circuit 23 into a high-frequency current at any oscillation frequency, and then supplies the current to the induction line 14.

The inverter 24 includes switching elements 38 arranged in a full bridge configuration. The switching elements 38 are driven by a pulse signal outputted from the frequency/current controller 43. The switching elements 38 convert a direct current inputted from the step-down circuit 23 into a high-frequency alternating current, and then supply the current as an output current to the induction line 14.

The frequency/current controller 43 receives a direct voltage and a direct current to be inputted to the inverter 24 and a rate of increase in output voltage by the frequency transformer 13. Furthermore, the frequency/current controller 43 receives the target frequency of the oscillation frequency of the inverter 24 from the main controller 41, which will be described later.

The frequency/current controller 43 drives the switching elements 38 so as to control the oscillation frequency of the inverter 24 to the target frequency inputted from the main controller 41; meanwhile, the frequency/current controller 43 drives the switching elements 38 so as to perform constant current control by determining a duty ratio (pulse width) having a preset constant current that is determined by calculating the current value of the induction line 14 based on the input voltage and current of the inverter 24 and the rate of increase in voltage. The determined duty ratio is outputted to the main controller 41.

"Main Controller 41"

The main controller 41 has the following functions:

(a) Start/Stop Function

In response to a power supply start command (a command for normally starting the power supply device 12) from the outside, an energy conservation reset command for resetting an energy-saving operation, or an intermittent operation/power supply start command for changing an off state to an on state during an intermittent operation, the stopping conductor 35 of the start/stop circuit 22 is opened, and then the starting conductor 33 is connected. At shutdown, the stopping conductor 35 is connected, and then the starting conductor 33 is opened.

A voltage inputted to the rectifying circuit 21 from the commercial power supply 11 is monitored. If the voltage rapidly drops in the event of an instantaneous power failure or the protective device detects an overload, the stopping conductor 35 of the start/stop circuit 22 is connected to shut down the power supply, and then the starting conductor 33 is opened. When the voltage is restored from the instantaneous power failure, the stopping conductor 35 of the start/stop circuit 22 is opened, and then the starting conductor 33 is connected.

(b) Step-Down Function

The second voltage mode command is normally outputted to the step-down controller 42. It is confirmed whether or not the duty ratio inputted from the frequency/current controller 43 is close to a maximum permissible duty ratio (e.g., 80%), and then the first voltage mode command is outputted to the step-down controller 42. When the inputted duty ratio becomes far from the maximum permissible duty ratio, the second voltage mode command is outputted to the step-down controller 42 again.

(c) Frequency Control Function

At the start of power supply (when the power supply start command, the energy conservation reset command, or the intermittent operation/power supply start command is inputted, or at the recovery from an instantaneous power failure), the target frequency of the oscillation frequency of the inverter 24 is swept from a low frequency shifted from a resonance frequency, e.g., 9.00 kHz (an example of a predetermined frequency) to 9.74 kHz, which is the resonance frequency, and then the target frequency is outputted.

In other words, at the start of power supply, the target frequency is set at a low frequency shifted from the resonance frequency, allowing the resonant circuit 50 to suppress total power obtainable by all the transport carriages 17 within normal rated power that can be supplied by the power supply device 12. After a predetermined time during which power supply to the induction line 14 can increase the output voltage of the power receiving unit 27 of the transport carriage 17 to a reference voltage, the target frequency is swept from the predetermined frequency of 9.00 kHz to the resonance frequency of 9.74 kHz.

Figure 2:
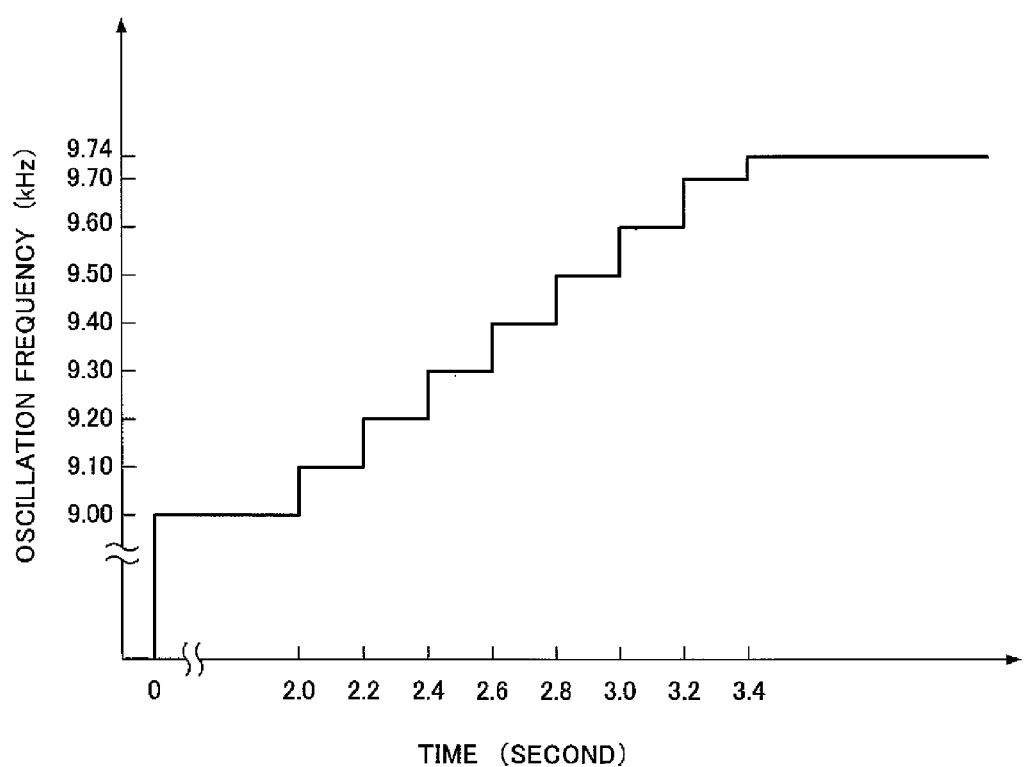
FIG. 2 shows a time variation of the oscillation frequency of a power supply device in the contactless power feed equipment.

Specifically, as shown in FIG. 2, the oscillation frequency of the inverter 24 is kept at 9.00 kHz for 2 seconds (an example of the predetermined time) from the start of power supply to the induction line 14, at 9.10 kHz for 0.2 seconds, at 9.20 kHz for 0.2 seconds, at 9.30 kHz for 0.2 seconds, at 9.40 kHz for 0.2 seconds, at 9.50 kHz for 0.2 seconds, at 9.60 kHz for 0.2 seconds, and then at 9.70 kHz for 0.2 seconds. After that, the target frequency is outputted to the frequency/current controller 43 so as to keep the output of 9.74 kHz (resonance frequency).

When power supply from the power supply device 12 to the induction line 14 is started during constant current control performed by the actions of the frequency/current controller 43 and the main controller 42, the inverter 24 sweeps the oscillation frequency from 9.00 kHz to 9.74 kHz.

<The Action of the Power Supply Device 12>

The action of the configuration of the power supply device 12 will be described below.

In an initial condition before power supply is started from the power supply device 12 to the induction line 14, it is assumed that the twenty transport carriages 17 are provided on the traveling rail having the induction line 14. Furthermore, it is assumed that the power supply device 12 is connected to the commercial power supply 11 of AC 200 V, the starting conductor 33 is opened, and the stopping conductor 35 is connected. The transport carriage 17 has rated power of 1800 W (power obtainable by the induction line 14 in a full-load condition (100% loaded condition) in a resonant condition of the resonant circuit 50 with the oscillation frequency of the power supply device 12). Moreover, the power supply device 12 has rated power (supplied power) of 30 kW. The rated power of the power supply device 12 is larger than power consumed by the load 58 of the traveling motor or the like that is necessary for a normal operation of the transport carriage 17. The rated power is set smaller than total power drawn by all the transport carriages 17 in the full-load condition (36 kW=1800 W×20) in the resonant condition with the oscillation frequency of the power supply device 12. Thus, the power supply device 12 does not require a large power capacity and is operable with a proper power capacity.

First, when the commercial power supply 11 is connected to the power supply device 12, the rectifying circuit 21 converts the alternating current of the commercial power supply 11 into a direct current and then outputs the direct current to the start/stop circuit 22. At this point, the starting conductor 33 is opened while the stopping conductor 35 is connected. Thus, the inrush current upon startup is suppressed (regulated) by the inrush resistor 31 and then is consumed by the discharging resistor 34. After the predetermined time, the starting conductor 43 is connected, the inrush resistor 31 is short-circuited, and then the stopping conductor 35 is opened, allowing a stable direct current to be outputted to the step-down circuit 23 after the inrush current is eliminated. At this point, a direct voltage rectified by the rectifying circuit 21 is DC 270 V.

Moreover, the target frequency of the oscillation frequency of the inverter 24 is set at 9.00 kHz. The target frequency is swept from 9.00 kHz to 9.74 kHz after a predetermined time (2 seconds).

Figure 3:
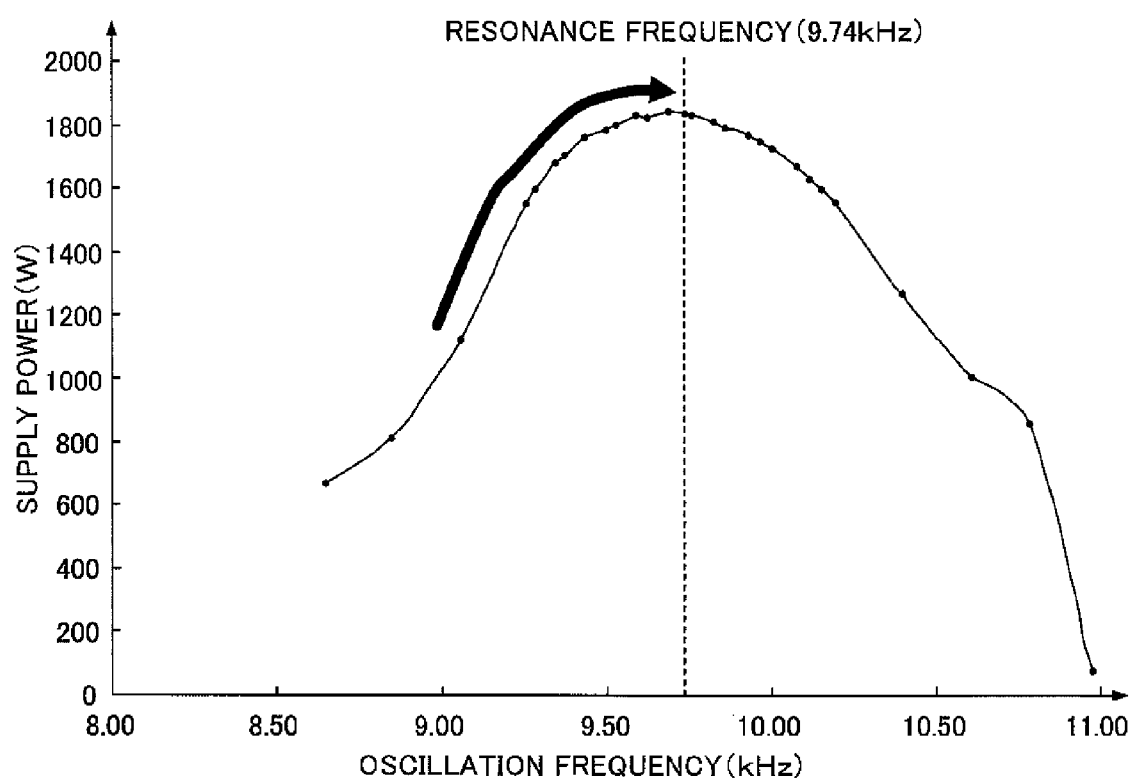
FIG. 3 shows the relationship between the oscillation frequency of the power supply device and power supplied to a mobile unit in the contactless power feed equipment.

At an oscillation frequency of 9.00 kHz, a current obtainable by the resonant circuit 50 of the transport carriage 17 is reduced. As shown in FIG. 3, rated power (1800 W) can be drawn at 9.74 kHz, whereas at 9.00 kHz shifted from the resonance frequency of 9.74 kHz, only 1200 W can be obtained (power is less efficiently supplied). When viewed from the power supply device 12, the total power supplied to all the transport carriages 17 is reduced. Hence, even if all the twenty transport carriages 17 are placed in the full-load condition, the total power is only 24 kW (=1200 W×20), which is lower than the rated power (30 kW) of the power supply device 12. This prevents an overloaded condition interrupting an output current.

When the oscillation frequency of the inverter 24 reaches 9.74 kHz, the transport carriage 17 can be placed in the full-loaded condition. After the predetermined time (2 seconds), the output voltage of the transport carriage 17 increases to the reference voltage, causing the normal transport carriage 17 to receive power equivalent to power consumed by the load 58. Hence, all the transport carriages 17 do not simultaneously obtain power in the full-load condition. Since an increase to the reference voltage is delayed in some of the transport carriages 17, only some of the transport carriages 17 obtain power in the full-load condition. This prevents the power supply device 12 from being overloaded, allowing stable power supply from the power supply device 12 to the induction line 14.

At shutdown, the stopping conductor 35 is connected, the starting conductor 33 is opened, and then the stopping conductor 35 is connected, allowing the discharging resistor 34 to consume charge accumulated in the power supply device 12.

If the oscillation frequency of the inverter 24 falls below 9.00 kHz, power obtainable by the transport carriage 17 further decreases, increasing a time period before the output voltage of the power receiving unit 27 increases to the reference voltage.

<The Power Receiving Unit 27 of the Transport Carriage>

As shown in FIG. 4, the power receiving unit 27 includes the resonant capacitor 52 and a rectifying circuit (full-wave rectifying circuit) 53 connected to the resonant capacitor 52.

The power receiving unit 27 further includes, as a constant voltage control circuit, a choke coil 54, a diode 55, the output capacitor (voltage capacitor) 56, a switching device (e.g., an output adjusting transistor) 57, and a controller (control unit) 61.

One end of the choke coil 54 is connected to a positive-side output terminal (one output terminal) 53a of the rectifying circuit 53. The anode of the diode 55 is connected to another end of the choke coil 54. One end of the output capacitor 56 is connected to the cathode of the diode 55 while another end of the output capacitor 56 is connected to a negative-side output terminal (the other output terminal) 53b of the rectifying circuit 53. One end of the switching device 57 is connected to the node of the other end of the choke coil 54 and the anode of the diode 55 while another end of the switching device 57 is connected to the negative-side output terminal 53b of the rectifying circuit 53. The controller 61 places the switching device 57 in a connected condition (the switching device is turned on) or an opened condition (the switching device is turned off).

The load 58 is connected between circuit output terminals 59a and 59b connected across the output capacitor 56.

The power receiving units 27 of the transport carriages 17 and the primary-side power supply device 12 are independently driven while receiving respective signals.

The controller 61 receives a full-wave input voltage (full-wave input voltage signal) $V_1$ of the choke coil 54 as a control signal. The full-wave input voltage is a voltage outputted to the positive-side output terminal 53a of the full-wave rectifying circuit 53 immediately after rectification. The controller 61 further receives a circuit output voltage (a voltage across the output capacitor 56, the voltage of the load 58) $V_2$ as a feedback signal. Moreover, the controller 61 outputs a driving pulse $P_2$ to the switching device 57. The controller 61 includes a gate pulse oscillator (an example of a pulse generating circuit) 62, a PWM module (an example of a pulse-width control circuit) 63, and a control power supply device 64.

"Control Power Supply Device 64"

The control power supply device 64 supplies control power (predetermined voltage $V_3$) to the gate pulse oscillator 62 and the PWM module 63 with the output voltage (a voltage across the output capacitor 56, the voltage of the load 58) $V_2$ serving as an input source. The output voltage (a voltage across the output capacitor 56, the voltage of the load 58) $V_2$ is 0 V upon startup. When the output voltage $V_2$ increases to a predetermined voltage (e.g., 15 V), the control power can be supplied at the predetermined voltage $V_3$.

"Gate Pulse Oscillator 62"

The gate pulse oscillator 62 is a pulse generating circuit that outputs, when receiving the control power from the control power supply device 64, a synchronizing pulse (trigger) at a frequency (2f) twice a frequency f of the high-frequency current of the induction line 14 (an example of multiple times the frequency f) in synchronization with the full-wave input voltage $V_1$ of the choke coil 54, the full-wave input voltage $V_1$ being outputted to the positive-side output terminal 53a of the full-wave rectifying circuit 53. The gate pulse oscillator 62 forms a synchronizing pulse $P_1$ and outputs the pulse as a switching trigger to the PWM module 63 each time the input voltage $V_1$ of the choke coil 54 in FIG. 6 becomes 0. The input voltage $V_1$ is the output voltage of the full-wave rectifying circuit 53 and thus has a continuous waveform at the frequency 2f, leading to the output of the synchronizing pulse $P_1$ at the frequency 2f.

"PWM Module 63"

The PWM module 63 receives the output voltage $V_2$ and the synchronizing pulse $P_1$ outputted from the gate pulse oscillator 62. The PWM module 63 is a pulse width control circuit that outputs the driving pulse $P_2$ to the switching device 57 when receiving the control power from the control power supply device 64, connects the switching device 57 when the driving pulse $P_2$ is on, and opens the switching device 57 when the driving pulse $P_2$ is off. The PWM module 63 is configured as illustrated in FIG. 5.

Figure 5:
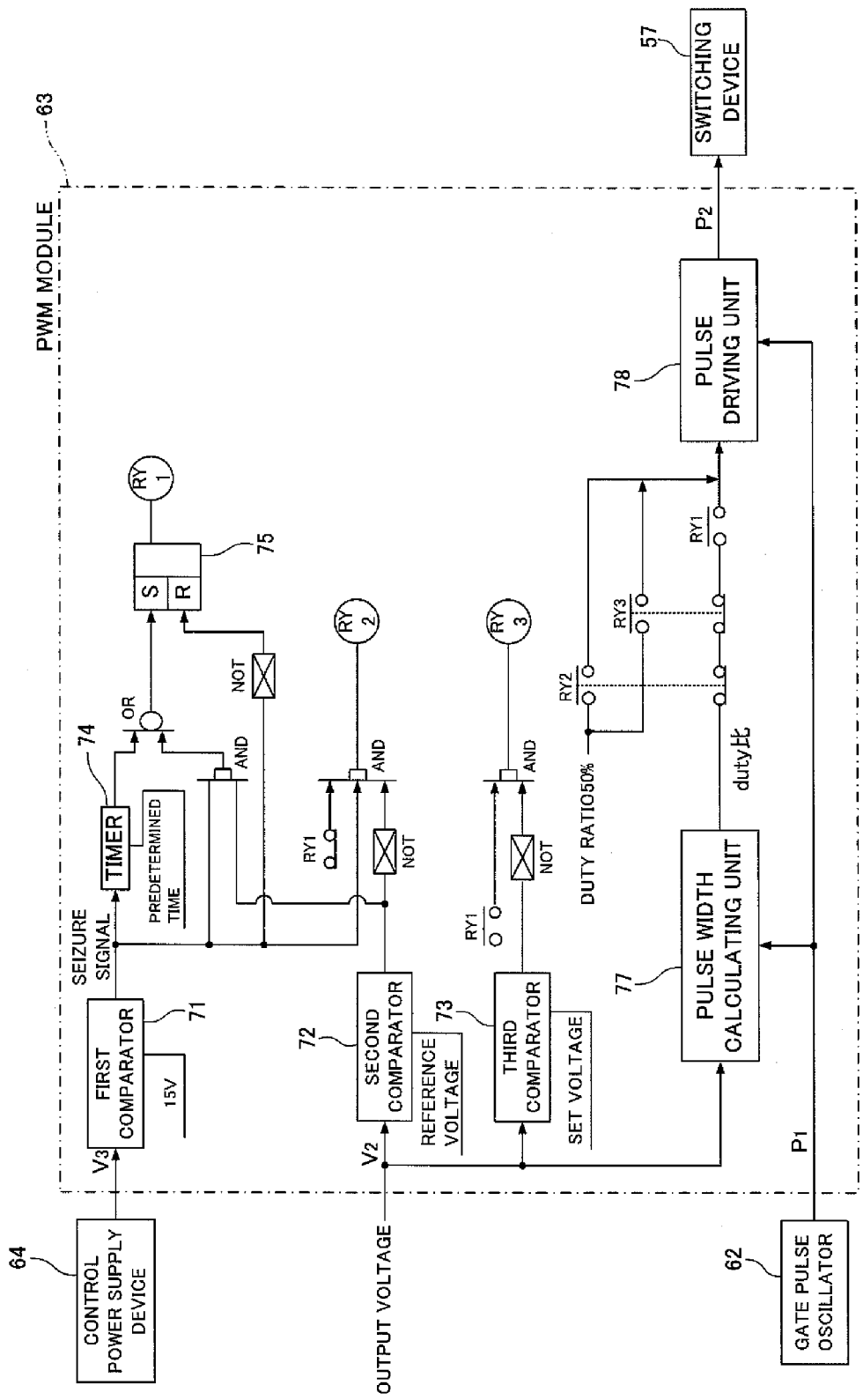
FIG. 5 is a control block diagram showing a PWM module in the secondary-side power receiving circuit in the contactless power feed equipment.

As shown in FIG. 5, the PWM module 63 includes a first comparator 71, a second comparator 72, a third comparator 73, a timer 74, an RS flip-flop 75, a pulse width calculating unit 77, and a pulse driving unit 78.

The first comparator 71 confirms whether control power has been supplied or not, that is, the voltage $V_3$ of control power is at least a predetermined voltage (e.g., 15 V). The second comparator 72 confirms whether the output voltage $V_2$ is at least a reference voltage (e.g., 310 V) or not. The third comparator 73 confirms whether the output voltage $V_2$ is at least a set voltage (e.g., 100 V) or not.

The timer 74 is a timer that starts counting in a preset time (predetermined time, e.g., 5 seconds) in response to the output signal of the first comparator 71, that is, a seizure signal outputted when control power is supplied (started).

The RS flip-flop 75 is set when a signal (progression signal) outputted in response to the counting of the timer 74 is turned on or when the seizure signal is turned on and the output signal of the second comparator 72 is turned on. The RS flip-flop 75 is reset when the seizure signal is turned off.

The PWM module 63 includes a relay RY1 operated (excited) when the RS flip-flop 75 is set. The PWM module 63 further includes a relay RY2 operated (excited) when the seizure signal is turned on, the output signal of the relay RY1 is turned off (a contact b is connected) and the output signal of the second comparator 72 is turned off. Moreover, the PWM module 63 includes a relay RY3 operated (excited) when the output signal (contact a) of the relay RY1 is turned on and the output signal of the third comparator 73 is turned off.

In the block configuration, the relay RY1 is operated when the supply of a high-frequency current I to the induction line 14 is started (the seizure signal is on) and the output voltage $V_2$ reaches at least the reference voltage (e.g., 310 V, when the output signal of the second comparator 72 is turned on). Alternatively, the relay RY1 is operated upon the lapse of the set time (the predetermined time, e.g., 5 seconds, when the output signal of the timer 74 is turned on). In other words, the relay RY1 is operated during a transition from the initial condition to a normal condition. The relay RY2 is operated when the supply of the high-frequency current I to the induction line 14 is started (the seizure signal is on) and the output voltage $V_2$ is lower than the reference voltage (e.g., 310 V when the output signal of the second comparator 72 is turned off), that is, in the initial condition. During the transition to the normal condition (when the relay RY1 is operated), the relay RY2 is not operated. The relay RY3 is operated if the output voltage $V_2$ abnormally falls below the set voltage (e.g., 100 V) during an operation of the relay RY1 (in the normal condition).

The pulse width calculating unit 77 receives the output voltage $V_2$ and the synchronizing pulse $P_1$. The pulse width calculating unit 77 performs output voltage feedback control with reference to the reference voltage serving as a target voltage.

Figure 6:
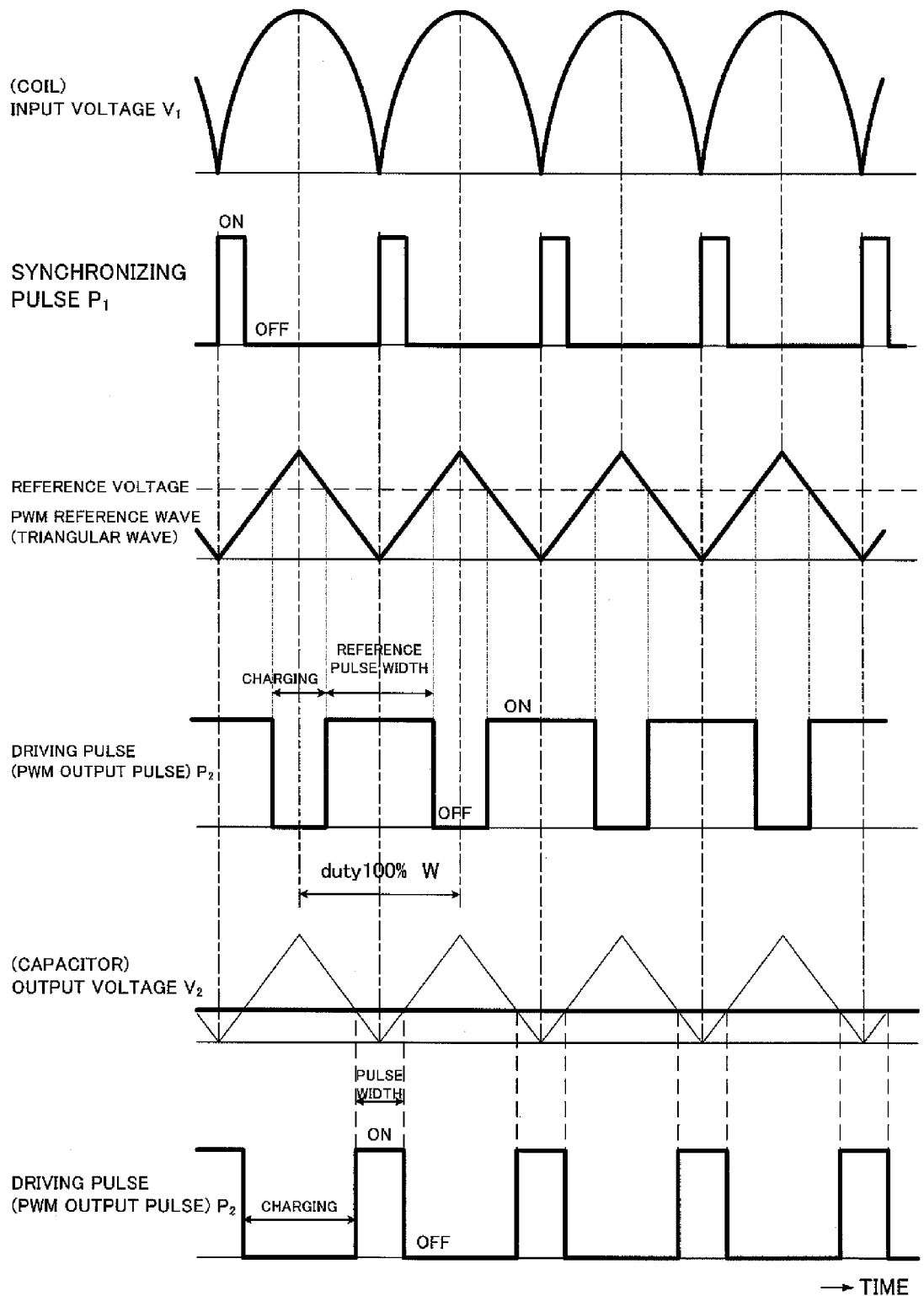
FIG. 6 is a characteristic chart showing the parts of the secondary-side power receiving circuit in the contactless power feed equipment, and a driving pulse output when a capacitor output voltage is lower than a reference voltage.

Specifically, as shown in FIG. 6, the pulse width calculating unit 77 forms a PWM reference wave (triangular wave) in synchronization with the synchronizing pulse $P_1$ at the frequency 2f from the gate pulse oscillator 62. In other words, the pulse width calculating unit 77 forms a triangular wave that peaks at the peak of the input voltage $V_1$ in synchronization with the input voltage $V_1$ of the choke coil 54. The pulse width calculating unit 77 presets the reference voltage (chain line) of the output voltage $V_2$, the reference voltage crossing the triangular wave. The driving pulse $P_2$ is turned on when the input voltage $V_1$ of the choke coil 54 decreases from the peak. The pulse width of the driving pulse $P_2$ is a time period when the triangular wave (voltage) is lower than the reference voltage. When the output voltage $V_2$ is equal to the reference voltage, the "reference pulse width" of the driving pulse $P_2$ is a time period during which the voltage of the triangular wave is lower than the reference voltage. When the load 58 is a rated load, the output voltage $V_2$ is kept at the reference voltage by outputting the driving pulse $P_2$ having the reference pulse width.

Figure 7:
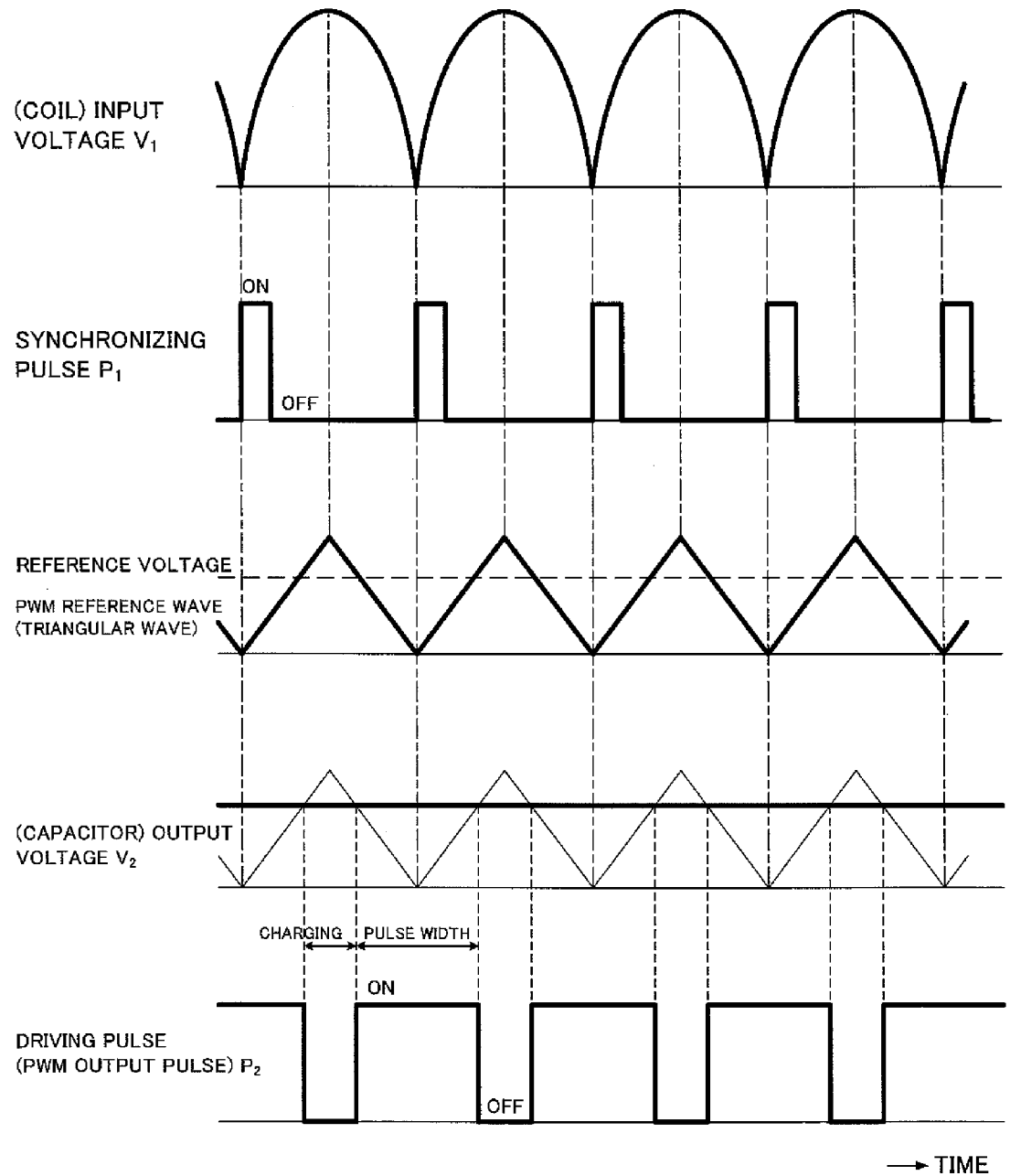
FIG. 7 is a characteristic chart showing the parts of the secondary-side power receiving circuit in the contactless power feed equipment, and a driving pulse output when the capacitor output voltage is higher than the reference voltage.

Moreover, the pulse width of the driving pulse $P_2$ is obtained by causing the inputted output voltage $V_2$ to cross the triangular wave. As shown in FIG. 6, when the output voltage $V_2$ is lower than the reference voltage, the pulse width of the driving pulse $P_2$ is shorter than the "reference pulse width". As shown in FIG. 7, when the output voltage $V_2$ is higher than the reference voltage, the pulse width of the driving pulse $P_2$ is made longer than the "reference pulse width". Furthermore, a duty ratio is determined and then is outputted to the pulse driving unit 78.

The pulse driving unit 78 outputs a pulse to the switching device 57. The pulse driving unit 78 receives the synchronizing pulse $P_1$. When the output signal (contact a) of the relay RY2 is turned on (initial condition) or the Output signal (contact a) of the relay RY3 is turned on (when the output voltage $V_2$ abnormally decreases), a preset duty ratio (hereinafter, will be called a fixed duty ratio, e.g., 50%) is inputted to the pulse driving unit 78. When the output signal (contact a) of the relay RY1 is turned on, a duty ratio outputted from the pulse width calculating unit 77 is inputted to the pulse driving unit 78. The pulse driving unit 78 forms the driving pulse $P_2$ based on the inputted duty ratio, and outputs the intermediate point of the driving pulse $P_2$ as the zero crossing position of the full-wave input voltage $V_1$ to the switching device 57, enabling pulse width control.

The fixed duty ratio is determined as follows: the rated power of the power supply device 12 is first divided by the number of transport carriages (an example of the apparatus or the device) 17 to be provided with power, determining power receivable by each of the transport carriages at the beginning of power supply to the induction line 14.

Subsequently, when the driving pulse $P_2$ has a pulse width of 0, in other words, when the driving pulse $P_2$ is turned off, the switching device 57 is continuously opened, and the output capacitor 56 is continuously charged, the secondary side is in a full-load condition (100% loaded condition) with respect to the primary side (power supply device 12). When the pulse width is m (a driving pulse that can be outputted has a (maximum) pulse width of W), the outputted driving pulse $P_2$ places the switching device 17 in a connected condition so as not to charge the output capacitor 56. Thus, the secondary side is in a loaded condition of (1−m/W) with respect to the primary side (as the pulse width m decreases, the secondary side comes close to the full-load condition).

In the loaded condition of (1−m/W), the pulse width m is set so as to suppress power to the determined "power receivable by each of the transport carriages".

The pulse width m of the driving pulse $P_2$ that can suppress power within the receivable power is divided by the pulse width W of the driving pulse that can be outputted, thereby determining the fixed duty ratio (=m/W). In the present embodiment, a load of 50% is determined.

At this point, the power supply device 12 for supplying a high-frequency current to the induction line 14 starts in a half-load condition (50% load condition) even if all the transport carriages 17 are simultaneously loaded when power supply is started. Thus, the power supply device 12 is not overloaded, avoiding an interruption of power supply.

The set time of the timer 74 includes a margin for a time period during which the output capacitor 17 is charged in a loaded condition with the fixed duty ratio so as to increase the output voltage $V_2$ to the reference voltage (e.g., 310 V).

In the configuration of the PWM module 63, the driving pulse $P_2$ is turned on when the input voltage $V_1$ of the choke coil 54 decreases from the peak in synchronization with the synchronizing pulse $P_1$ at the frequency 2f. High-speed switching is performed at the switching frequency 2f while the intermediate point of the pulse width of the driving pulse $P_2$ is located as the zero crossing position of the full-wave input voltage $V_1$.

When the output signal (contact a) of the relay RY2 is turned on, that is, when the output voltage $V_2$ is lower than the reference voltage upon startup, high-speed switching is performed with the fixed duty ratio of 50%.

When the output signal (contact a) of the relay RY1 is turned on, that is, the output voltage $V_2$ is not lower than the reference voltage upon startup, or when the timer 74 counts up, high-speed switching is performed with the duty ratio outputted from the pulse width calculating unit 77, that is, output voltage feedback control is performed with the reference voltage serving as a target voltage. At this point, the stopping of the traveling motor reduces the load 58 and increases the output voltage $V_2$ over the preset reference voltage. Thus, the pulse width m of the driving pulse $P_2$ outputted to the switching device 57 is increased (the connected condition of the switching device 57 is extended) to reduce the output voltage $V_2$. When the output voltage $V_2$ returns to the reference voltage, the pulse width m of the driving pulse $P_2$ outputted to the switching device 57 is reduced (the opened condition of the switching device 57 is extended), keeping the output voltage $V_2$ at the reference voltage.

In the case where the output signal (contact a) of the relay RY1 is turned on (a transition to output voltage feedback control) and then the output voltage $V_2$ falls below the set voltage (the relay RY3 is turned on), high-speed switching is performed with a fixed duty ratio of 50%.

<The Action of the Power Receiving Unit 27>

The action of the configuration of the power receiving unit 27 will be described below.

When the high-frequency current I is supplied to the induction line 14 on the primary side, magnetic fluxes generated on the induction line 14 induce an induced electromotive force on the pickup coil 51, and then a current generated on the pickup coil 51 by the induced electromotive force is rectified by the full-wave rectifying circuit 53.

"Immediately after Startup"

Before startup, the output capacitor 56 is empty while the output voltage $V_2$ is 0 V. Immediately after the supply of the high-frequency current I to the induction line 14 is started, control power cannot be supplied from the control power supply device 64. At this point, the PWM module 63 cannot output the driving pulse $P_2$. Thus, the switching device 57 is opened and the output capacitor 56 is continuously charged by a current outputted from the full-wave rectifying circuit 53.

"Upon Startup"

The output capacitor 56 is charged and the output voltage $V_2$ increases so as to allow the supply of control power from the control power supply device 64. In this state, the synchronizing pulse $P_1$ is inputted from the gate pulse oscillator 62 to the PWM module 63, the seizure signal is turned on by confirming control power, and then the timer 74 is driven. At this point, the output voltage $V_2$ is lower than the reference voltage, limiting the fixed duty ratio to 50%. In other words, high-speed switching is performed with a half load.

In other words, the switching device 57 undergoes high-speed switching at the switching frequency 2f (e.g., f=10 kHz, limited to 60 kHz or lower). When the switching device 57 is opened (the driving pulse $P_2$ is turned off), a current outputted from the full-wave rectifying circuit 53 charges the output capacitor 56 with the excitation energy of the choke coil 54 while being supplied to the load 58. When the switching device 57 is in a connected condition (the driving pulse $P_2$ is turned on), a current outputted from the full-wave rectifying circuit 53 excites the choke coil 54 to charge energy; meanwhile, a discharge current is supplied from the output capacitor 56 to the load 58.

Upon startup, a current passing through the induction line 14 has a frequency of 9.00 kHz, which is shifted from the resonance frequency of the resonant circuit 50. Thus, only 1200 W can be obtained in a full-load condition, indicating that only 600 W can be obtained in a half-load condition.

"After a Reference Time from Startup/in Normal Condition"

When the timer 74 counts up, output voltage feedback control is performed forcibly or in response to the output voltage $V_2$ not lower than the reference voltage serving as a target voltage. High-speed switching is performed with a duty ratio outputted from the pulse width calculating unit 77.

Specifically, the switching device 57 undergoes high-speed switching at the switching frequency 2f, the pulse width of the driving pulse $P_2$ is determined by the output voltage $V_2$ when the pulse is turned on. The pulse width is reduced when the output voltage $V_2$ is lower than the preset reference voltage, whereas the pulse width is increased when the output voltage $V_2$ is higher than the reference voltage. In other words, the load 58 decreases while a voltage across the output capacitor 56, that is, the output voltage $V_2$ increases. If the output voltage $V_2$ exceeds the reference voltage, the switching device 57 is placed in a connected condition for an extended period, reducing the output voltage $V_2$ to the constant reference voltage. Furthermore, the load 58 increases, the voltage across the output capacitor 56, that is, the output voltage $V_2$ decreases, and the output voltage $V_2$ falls below the reference voltage. Thus, the switching device 57 is placed in an opened condition for an extended period, increasing the output voltage $V_2$ to the constant reference voltage.

The switching frequency is correctly set at 2f, and the driving pulse $P_2$ is turned on when the input voltage $V_1$ of the choke coil 54 decreases from the peak. Thus, when the driving pulse $P_2$ is turned on, that is, the choke coil 54 is excited, a current supplied to the choke coil 54 by the resonant circuit 50 is shifted in phase by 90° and thus is substantially zero. After that, the input voltage $V_1$ decreases in the zero-crossing range of the input voltage $V_1$, suppressing an increase in current (coil current) $I_1$ passing through the choke coil 54 into a smooth current (reduced pulsation). The ripple of the coil current $I_1$ is reduced so as to have a smaller difference between the input voltage and the output voltage of the choke coil 54, considerably suppressing the ripple of the coil current $I_1$.

High-speed switching at the switching frequency 2f quickly responds to fluctuations of the load 58, reducing the influence of fluctuations of the load 58 on the induction line 14 through the resonant circuit 50, for example, the influence of an overcurrent of the induction line 14 when a feedback impedance rapidly comes close to zero.

Moreover, high-speed switching at the switching frequency 2f quickly responds to the output voltage $V_2$ during a transition from a nonresonant condition to a resonant condition, suppressing a rapid increase in resonant voltage.

The output voltage is increased by high-speed switching and a step-up topology. Even if the resonance frequency of the pickup coil 51 is deviated from the frequency f of the high-frequency current I supplied to the induction line 14, the supplied power can be kept. In other words, the frequency response of power supply is improved from the related art so as to obtain power over a wide range of frequency deviations, allowing stable power supply even if the frequency of the high-frequency current is deviated.

"Abnormal Condition"

During output voltage feedback control, if the output voltage $V_2$ falls below the set voltage, high-speed switching is performed while the duty ratio is limited to the fixed duty ratio of 50%, that is, in a half-load condition.

Specifically, if the output voltage $V_2$ continuously falls below the reference voltage, the duty ratio is 0%, that is, the switching device 57 is opened into a full-load condition so as to fully charge the output capacitor 56 back to the reference voltage. If the output voltage $V_2$ does not increase but decreases to the set voltage, it is decided that a current has been abnormally supplied to the induction line 14. Thus, high-speed switching is performed in a half-load condition so as not to apply a load to the induction line 14.

According to the explanation of the action of the power supply device 12 and the action of the power receiving unit 27, the power supply device 12 and the power receiving units 27 of the transport carriages 17 are independently driven while receiving respective signals. Upon startup, however, the power supply device 12 regulates the frequency of a high-frequency current passing through the induction line 14, the frequency being obtained by each of the transport carriages 17 as a frequency shifted from the resonance frequency; meanwhile, the transport carriages 17 are placed in a half-load condition, regulating the frequency obtained by each of the transport carriages 17. This prevents the power supply device 12 from being overloaded and prevents a high-frequency current passing through the induction line 14 from being interrupted so as to block power supply.

In the event of an instantaneous power failure, an interrupted high-frequency current does not rapidly reduce the output voltage of the transport carriage 17 to the set voltage. Moreover, upon recovery of the high-frequency current, the transport carriages 17 are placed in a half-load condition and the frequency obtained by each of the transport carriages 17 is not limited. Thus, power is obtained by the transport carriages 17 in a full-load condition. This can prevent, upon "instantaneous power failure", the power supply device 12 from becoming overloaded only by shifting, from the resonance frequency, the frequency of the high-frequency current passing through the induction line 14, thereby avoiding an interruption of the high-frequency current passing through the induction line 14 so as to keep power supply.

As has been discussed, according to the present embodiment, when the power supply device 12 starts supplying power to the induction line 14, the oscillation frequency of the inverter 24 of the power supply device 12 is set at the predetermined frequency of 9.00 kHz shifted from 9.74 kHz that is the resonance frequency of the resonant circuit 50 of the transport carriage 17. Hence, even if power is obtained by all the transport carriages 17 in the full-load condition from the induction line 14 connected to the power supply device 12, total power obtained by all the transport carriages 17 can be suppressed within power that can be supplied by the power supply device 12, preventing the power supply device 12 from becoming overloaded. After a predetermined time during which the output voltage of the voltage capacitor 56 of the power receiving unit 27 can increase to the reference voltage, a change from the predetermined frequency of 9.00 kHz to the resonance frequency of 9.74 kHz increases power that can be obtained by the transport carriages 17 from the induction line 14. At this point, the transport carriage 17 in a normal condition only obtains power equivalent to power consumed by the load 58 of the traveling motor or the like in the transport carriage 17. Thus, power is not simultaneously obtained by all the transport carriages 17 in the full-load condition. Since an increase in the output voltage of the voltage capacitor 56 to the reference voltage is delayed in some of the transport carriages 17, only some of the transport carriages 17 obtain power in the full-load condition. Hence, the power supply device 12 is not overloaded, stably starting power supply from the power supply device 12 to the induction line 14.

According to the present embodiment, the oscillation frequency of the inverter 24 of the power supply device 12 is continuously or gradually increased from the predetermined frequency of 9.00 kHz to the resonance frequency of 9.74 kHz, preventing a load from being rapidly applied to the inverter 24 of the power supply device 12. Furthermore, the resonance frequency of the resonant circuit 50 of the transport carriage 17 is set at 9.74 kHz lower than 10 kHz, and the predetermined frequency is set at 9.00 kHz which is lower than the resonance frequency. Thus, a used frequency band ranges from 9.00 kHz to 9.74 kHz, which is lower than 10 kHz. This can more stably start power supply from the power supply device 12 to the induction line 14 without the need for energy or cost for applications for permission in compliance with the regulations of the Radio Law (Japan).

According to the present embodiment, the power capacity of the power supply device 12 is larger than obtained power while the duty ratio of the switching device 57 is changed with the load 58 having varying power consumption when the transport carriages 17 are normally operated. As in the startup for starting power supply from the power supply device 12 to the induction line 14, the power capacity is smaller than total power obtained in the full-load condition in a resonant condition where the oscillation frequency of the inverter 24 of the power supply device 12 is 9.74 kHz that is the resonance frequency of the resonant circuit 50 of the transport carriage 17. Hence, the power supply device 12 has a proper power capacity that can suppress an increase in equipment cost.

In the present embodiment, the oscillation frequency of the inverter 24 is controlled so as to gradually change from 9.00 kHz, which is the predetermined frequency lower than the resonance frequency of 9.74 kHz, to the resonance frequency of 9.74 kHz. As shown in FIG. 3, also in the case where the oscillation frequency of the inverter 24 is controlled so as to gradually change to a frequency higher than the resonance frequency of 9.74 kHz, power supplied to the transport carriages 17 can be reduced. The oscillation frequency of the inverter 24 may be controlled so as to gradually change from a frequency (e.g., 10.5 kHz) higher than the resonance frequency (9.74 kHz) to the resonance frequency (9.74 kHz).

According to the present embodiment, the oscillation frequency of the inverter 24 is gradually changed to the resonance frequency every 0.1 kHz. The interval is not limited to 0.1 kHz and thus may be set larger or smaller than 0.1 kHz to continuously change the frequency.

According to the present embodiment, the PWM module 63 of the controller 61 forms the PWM reference wave (triangular wave) in synchronization with the synchronizing pulse $P_1$ at the frequency 2f from the gate pulse oscillator 62.

Three PWM reference waves (triangular waves) may be formed by two waveforms of the input voltage $V_1$ in synchronization with every other period of the synchronizing pulse $P_1$ so as to turn on the driving pulse $P_2$ on the rising edge of each triangular wave. At this point, the switching frequency of the driving pulse $P_2$ is three times as high as the high-frequency current frequency f (3f), enabling faster switching. Thus, the high-speed switching more quickly responds to fluctuations of the load 58, reducing the influence of fluctuations of the load 58 on the induction line 14 through the resonant circuit 50, for example, the influence of an overcurrent of the induction line 14 when a feedback impedance rapidly comes close to zero. Moreover, the high-speed switching quickly responds to the output voltage $V_2$ during a transition from a nonresonant condition to a resonant condition, suppressing a rapid increase in resonant voltage.

The present embodiment described the transport carriage 17 as an example of the apparatus or the device. The apparatus or the device includes a motor vehicle having no transport function, or a stationary apparatus or device.

Having described the invention, the following is claimed:

1. Contactless power feed equipment that feeds a high-frequency current from a power supply device to an induction line, and then feeds power to a plurality of devices or apparatuses in a contactless manner from the induction line having received the high-frequency current,
the device or apparatus comprising:
a pickup coil opposed to the induction line, the pickup coil receiving an induced electromotive force from the induction line;
a resonant capacitor connected in parallel to the pickup coil, the resonant capacitor forming a resonant circuit that resonates at a frequency of the high-frequency current with the pickup coil;
a full-wave rectifying circuit connected in parallel with the resonant capacitor of the resonant circuit;
a switch and an output capacitor connected in parallel between output terminals of the full-wave rectifying circuit, the output capacitor feeding power to a load having varying power consumption; and
a controller that controls a voltage of the output capacitor to a constant reference voltage by switching a connected condition and an opened condition of the switch,
the power supply device comprising:
a rectifying circuit that converts an alternating current from a commercial power supply to a direct current;
an inverter that converts the direct current to a high-frequency current having any oscillation frequency and then supplies the current to the induction line; and
a controller that controls an oscillation frequency of the inverter of the power supply device to a predetermined frequency shifted from a resonance frequency of the resonant circuit at start of power supply from the power supply device to the induction line such that the resonant circuit suppresses total power obtainable by all the devices or apparatuses within power that can be supplied by the power supply device, the controller changing the predetermined frequency to the resonance frequency after a predetermined time during which the power supply to the induction line is capable of increasing an output voltage of the output capacitor of the device or apparatus to a reference voltage.

2. The contactless power feed equipment according to claim 1, wherein the resonant circuit has a resonance frequency lower than 10 kHz, and the controller sets the predetermined frequency at a frequency lower than the resonance frequency and continuously or gradually increases the oscillation frequency of the inverter from the predetermined frequency to the resonance frequency.

3. The contactless power feed equipment according to claim 1, wherein a capacity of power that can be supplied by the power supply device is larger than total power obtained by the resonant circuits in all the devices or apparatuses in a resonant condition according to a load with varying power consumption, and the capacity of power is smaller than total power obtained by the resonant circuits in all the devices or apparatuses in the resonant condition in a full-load condition.

4. The contactless power feed equipment according to claim 2, wherein a capacity of power that can be supplied by the power supply device is larger than total power obtained by the resonant circuits in all the devices or apparatuses in a resonant condition according to a load with varying power consumption, and the capacity of power is smaller than total power obtained by the resonant circuits in all the devices or apparatuses in the resonant condition in a full-load condition.

* * * * *